Figures 1, 2, 3:
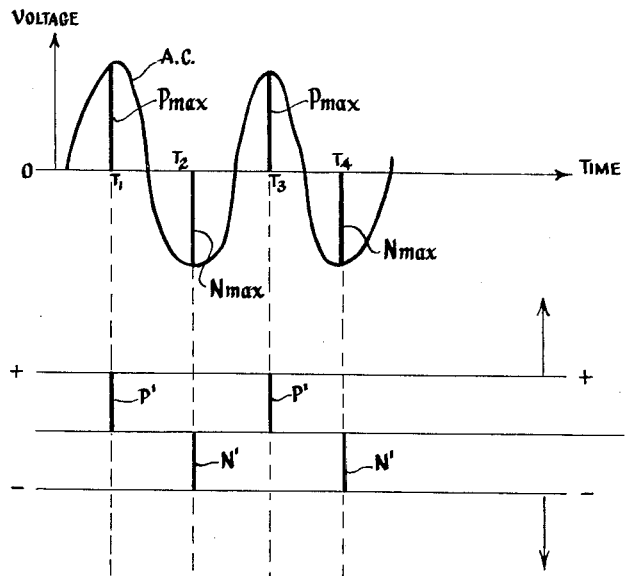

Nov. 22, 1960

P. R. JOHANNESSEN 2,961,590

A.C. SERVOSYSTEM WITH D.C. DAMPING
FEEDBACK TO MAGNETIC AMPLIFIER

Filed Feb. 21, 1958

2 Sheets-Sheet 1

INVENTOR.
Paul R. Johannessen
BY Rines and Rines

ATTORNEYS

INVENTOR.
Paul R. Johannessen
BY Rines and Rines
ATTORNEYS

United States Patent Office 2,961,590
Patented Nov. 22, 1960

2,961,590

A.C. SERVOSYSTEM WITH D.C. DAMPING FEEDBACK TO MAGNETIC AMPLIFIER

Paul R. Johannessen, 87—3 Lyman St., Waltham 54, Mass., assignor, by direct and mesne assignments, of one-third to John C. Simons, Jr., Weston, and one-third to Robert H. Rines, Belmont, Mass.

Filed Feb. 21, 1958, Ser. No. 716,730

23 Claims. (Cl. 318—448)

The present invention relates to voltage comparator systems and methods and, more particularly, to systems for compensating for inadequate dynamic characteristics of servo control apparatus and the like.

In accordance with present-day servo techniques, a control or reference voltage is used to drive a servo motor and the like. A first feedback path or loop is customarily employed to provide for continual comparison of and correspondence between the position of the servo motor shaft and the intended position represented by the reference or control signal. One or more minor feedback paths or loops for reproducing first and higher derivatives of the reference or control signal to be followed have also been employed. Unfortunately, the dynamic characteristics of such feedback systems are inherently poor in view of instabilities in the feedback paths. Comparison of the voltage amplitude of such derivatives of the reference or control signal as velocity and acceleration, for example, is usually effected with the aid of chopper circuits and filters that attempt to produce wave-form correspondence between the voltages to be compared.

Such systems, in addition to their poor dynamic characteristics, are subject to numerous other disadvantages, however, including failure of the mechanical chopper, sensitiveness to noise signals, and inaccuracy occasioned by spurious signals, such as signals in phase quadrature or deviations in wave shape.

An object of the present invention, accordingly, is to provide a new and improved control system and method that shall not be subject to any of the above disadvantages; but that, to the contrary, shall provide compensation for the poor dynamic characteristics of such systems and shall provide for obtaining voltage differences without requiring similar waveforms in the voltages-to-be-compared, without requiring the use of moving chopper parts and the like, without sensitiveness to noise, and without problems of spurious phase-quadrature signals.

In summary, this result is obtained through producing a direct-current voltage corresponding to the positional velocity or acceleration of the servo motor and the like, subtracting the same from the alternating-current voltage, sampling the difference voltage at preselected sampling time intervals, maintaining the sampled difference signal at each preselected instant substantially constant until the occurrence of the next successive pre-selected instant, and applying the resulting signal to the servo-motor and the like to correct its operation. preferred details are hereinafter set forth.

Another obejct is to provide a new and improved voltage comparator system of more general utility that may be employed wherever the results of the present invention are desired.

Other and further objects will be explained hereinafter and will be more particularly pointed out in connection with the appended claims.

The invention will now be described in connection with the accompanying drawings.

Figure 4:
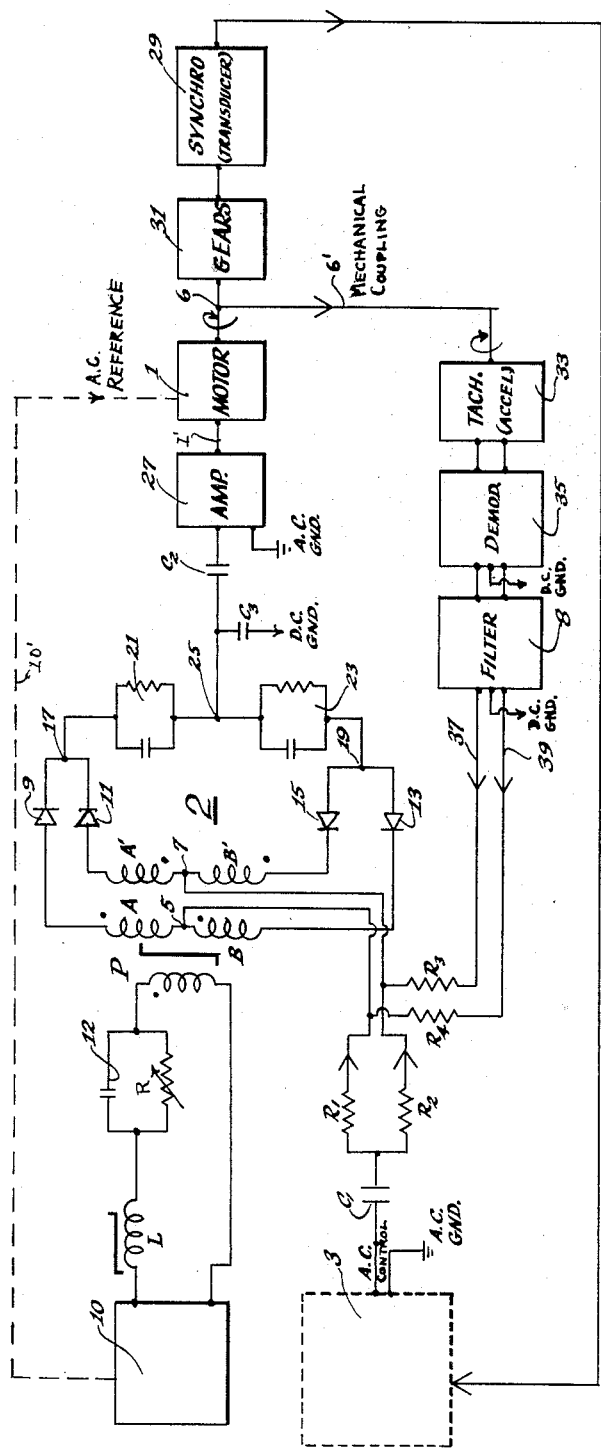

Figs. 1 through 3 of which are wave-form graphs illustrating the timing of parts of the system of the invention; and Fig. 4 is a schematic circuit diagram of a preferred embodiment of the invention.

While, as before stated, the invention is of broader utility and more general use, for illustrative purposes it is shown applied to a servo control system. A servo motor or other moving load 1 is shown in Fig. 4 energized by an alternating-current current control reference signal "A.C. Reference," produced in customary manner, as schematically represented by the block 10 and the dotted connection 10'. A control voltage from an alternating-current source 3 is, as later explained, applied at 1' to the control winding of the motor 1. This control voltage "A.C. Control" is plotted in the graph of Fig. 1 with voltage amplitude indicated along the ordinate, and time along the abscissa. This control signal is fed from the source 3 through a coupling condenser $C_1$ and a pair of resistors $R_1$ and $R_2$ to the intermediate points 5 and 7 of a magnetic sampling and holding circuit 2. The magnetic circuit 2 comprises two pairs of series-connected windings A, B and A', B'. The windings A and A' are connected together through oppositely poled rectifiers 9 and 11, and the winding B and B' are similarly connected through oppositely poled rectifiers 13 and 15. The junctions 17 and 19 of the respective rectifiers 9—11 and 13—15 are connected together through respective resistance-capacitance networks 21 and 23, series-connected at the junction 25. The control signal is applied from the junction 25 through the further coupling condenser $C_2$ to one or more servo amplifier stages 27. The other terminal of the control-signal path is shown as the "A.C. GND," meaning a'ternating-current ground, interconnecting the lower output terminal of the control-signal source 3 and the lower input terminal of the servo amplifier 27. The amplifier 27, in turn, applies to the control winding of the servo motor or other device 1, a voltage in phase quadrature with the control voltage "A.C.," as is well known.

A "synchro" or transducer 29, coupled to the shaft 6 of the motor 1 by a gear train 31, as is also well known, provides voltages for appropriately varying the control-voltage source 3 through a first principal feedback path or loop 4. Rapid correction voltages are obtained by mechanically coupling the servo motor shaft 6 to a velocity-measuring or tachometer circuit 33, as schematically represented at 6', to produce a voltage signal related to the angu'ar or positional velocity of the servo motor 1. The tachometer circuit 33 is disposed in a further or minor feedback loop. If the tachometer 33 is of the alternating-current type, its output will be detected in a demodu'ator 35 in this minor feedback loop, providing preferably a push-pull direct-current signal, shown by the horizontal graph lines + and —, Fig. 2, that fluctuates in vertical level as the velocity varies, as indicated by the vetrical arrows. In order to provide improved low-frequency response, the demodulated fluctuating push-pull direct-current signal +, —, is preferably passed through a high-pass filter 8 effectively to remove the tachometer feedback at low-frequencies, thus increasing the major loop gain at the low frequencies, and providing a high-frequency-selected signal. The selected signal is then fed by conductors 37 and 39 through respective resistors $R_3$ and $R_4$ to the same junctions 5 and 7 of the magnetic sampling and ho'ding circuit 2 to which the before-mentioned resistors $R_1$ and $R_2$ are connected. The direct-current ground connection "D.C. GND," for this second or minor feedback path 6', 33, 35, 8, 37—39, $R_3$—$R_4$, 2, 27, is shown at the bottom terminal of capacitor $C_3$, the upper terminal of which connects to the output junction 25 of the circuit 2.

In accordance with the present invention, the input to the magnetic circuit 2 is sampled, preferably at substantially the preselected successive instants of time $T_1$, $T_2$, $T_3$, $T_4$, etc., when the alternating-current control signal has its maximum positive and negative amplitudes, shown at $P_{max}$ and $N_{max}$ in Fig. 1. This sampling may also occur at other preselected instants of time during the positive and/or negative half-cycles, though the arrangement of Fig. 1 is preferred for reasons later explained. The reference alternating-current source 10 is shown connected through a saturable choke L, which controls the selection of the preselected instants of the sampling, and a resistance-capacitance network 12, to a primary winding P that is coupled to the windings A, B, A', B' of the magnetic sampling and holding circuit 2. The variable resistor R affords a fine control of the sampling time. Pulses are thus produced for controlling the sampling by affecting the saturation condition of the magnetic circuit 2.

The resistor network $R_1$, $R_2$, $R_3$, $R_4$ serves as a summing circuit for algebraically adding (in this case, subtracting) the control voltage from the source 3, and the positive or negative direct-current signal amplitude P' or N', Fig. 2. The sampling thus operates upon the difference between the control and direct current voltage signals. These connections provide that when the sampled $P_{max}$ and P' are compared at time instant $T_1$, an output correction or difference signal $(P_{max}-P')$ is produced, Fig. 3. The voltage $(P_{max}-P')$ is held and thus maintained substantially constant, as at 14, by the relatively large storage capacitor $C_3$, which becomes charged thereby, until the next successive sampling time instant $T_2$. The different voltage $(N_{max}-N')$ at time $T_2$ is then produced and is held and maintained substantially constant, as at 16, until the next successive time instant $T_3$; and so on. There will thus result at the input of the servo amplifier 27, a pure or clean substantially rectangular correction or error signal 14, 16, that is applied through the servo amplifier 27 to modify the control of the motor 1, as desired. Highly improved dynamic response to the positional velocity variations in the control system has thus been provided.

Not only is a simple voltage-comparison and summing system also provided, moreover, void of choppers or other moving parts, and not demanding signals of similar wave forms for comparison, but it will be clear that the sampling and holding procedure substantially eliminates any noise problems, and gives rise to the substantially pure rectangular voltages of Fig. 3. In addition, any spurious phase-quadrature signal will be of no effect since it produces zero signal at the preferred sampling time instants $T_1$, $T_2$, etc.

If desired, as indicated in Fig. 4, the circuit 33 may detect the derivative of velocity or acceleration instead of the velocity, in which event the filter 8 is preferably a low-pass filter, substantially integrating the high-frequency output of the acceleration-detecting circuit. This provides substantially the same dynamic characteristics as the combination of the tachometer 33 and the high-pass filter 8.

The order of the summing (subtracting), sampling and holding need not be that illustrated in Fig. 4. If desired, for example, the circuit could obviously be connected to effect sampling, subtracting and holding, or sampling, holding and subtracting, and the invention is intended to embrace any such order so long as the holding occurs in a step after, though not necessarily immediately after, the sampling.

Further modifications will also occur to those skilled in the art, including other types of summing, sampling or holding circuits, and all such are considered to fall within the spirit and scope of the invention as defined in the appended claims.

What is claimed is:

1. An electric system having, in combination, means for producing an alternating-current signal for controlling a load, means for producing a further signal the amplitude of which is to be maintained substantially equal to the amplitude of the alternating-current signal, means for sampling the signals at preselected instants of time, means for maintaining the sampled signals derived at each preselected instant substantially constant until the occurrence of the next successive preselected instant, thereby to produce a substantially rectangular-wave signal, means for deriving a voltage corresponding to the difference between the amplitudes of the signals, and means for connecting the difference-voltage-deriving means with the sampling and maintaining means to apply the difference voltage as a substantially rectangular-wave signal to the load.

2. An electric system having, in combination, means for producing an alternating-current signal for controlling a load, means for producing a direct-current signal the amplitude of which is to be maintained substantially equal to the amplitude of the alternating-current signal, means for sampling the signals at preselected instants of time, means for maintaining the sampled signals derived at each preselected instant substantially constant until the occurrence of the next successive preselected instant, thereby to produce a substantially rectangular-wave signal, means for deriving a voltage corresponding to the differences between the amplitudes of the signals, and means for connecting the difference-voltage-deriving means with the sampling and maintaining means to apply the difference voltage as a substantially rectangular-wave signal to the load.

3. An electric system having, in combination, means for producing an alternating-current signal for controlling a load, means for producing a push-pull direct-current signal the amplitude of which is to be maintained substantially equal to the amplitude of the alternating-current signal, means for sampling the signals at preselected instants of time, means for maintaining the sampled signals derived at each preselected instant substantially constant until the occurrence of the next successive preselected instant, thereby to produce a substantially rectangular-wave signal, means for deriving a voltage corresponding to the difference between the amplitudes of the signals, and means for connecting the difference-voltage-deriving means with the sampling and maintaining means to apply the difference voltage as a substantially rectangular-wave signal to the load.

4. An electric system having, in combination, means for producing an alternating-current signal for controlling a load, means for producing a further signal the amplitude of which is to be maintained substantially equal to the amplitude of the alternating-current signal at preselected instants of time during the cycle thereof, means for deriving a voltage corresponding to the difference between the amplitude of the alternating-current signal and the amplitude of the further signal, means for sampling the difference voltage at the said preselected instants, means for maintaining the sampled difference voltage derived at each preselected instant substantially constant until the occurrence of the next successive preselected instant, thereby to produce a substantially rectangular-wave signal, and means for applying the substantially rectangular-wave signal to the load.

5. An electric system having, in combination, means for producing an alternating-current signal for feeding a load, means for producing a direct-current signal the amplitude of which is to be maintained substantially equal to the amplitude of the alternating-current signal at preselected instants of time corresponding substantially to the maximum amplitude of the cycle thereof, means for deriving a voltage corresponding to the difference between the amplitude of the alternating-current signal and the amplitude of the direct-current signals, means for sampling the difference voltage at the said preselected instants, means for maintaining the sampled difference voltage derived at each preselected instant substantially constant until the occurrence of the next successive preselected instant, thereby to produce a substantially rectangular-wave signal, and means for applying the substantially rectangular-wave signal to the load.

6. An electric system having, in combination, means for producing an alternating-current signal for feeding a load, means for producing a direct-current signal the amplitude of which is to be maintained substantially equal to the amplitude of the alternating-current signal at preselected instants of time, means for deriving a voltage corresponding to the difference between the amplitude of the alternating-current signal and the amplitude of the direct-current signal, means for sampling the difference voltage at the said preselected instants, means for maintaining the sampled difference voltage derived at each preselected instant substantially constant until the occurrence of the next successive preselected instant, thereby to produce a substantially rectangular-wave signal, and means for applying the substantially rectangular-wave signal to the load.

7. An electric system having, in combination, means for producing alternating-current signal for controlling a load, means for producing a push-pull direct-current signal the amplitude of which is to be maintained substantially equal to the amplitude of the alternating-current signal at preselected instants of time during the positive and negative half-cycles thereof, means for deriving a voltage corresponding to the difference between the positive and negative amplitudes of the alternating-current signal and the positive and negative amplitudes, respectively, of the push-pull signal, means for sampling the difference voltage at the said pre-selected instants, means for maintaining the sampled difference voltage derived at each preselected instant substantially constant until the occurrence of the next successive preselected instant, thereby to produce a substantially rectangular-wave signal, and means for applying the substantially rectangular-wave signal to the load.

8. An electric system having, in combination, means for producing an alternating-current signal for controlling a load, means for producing a push-pull direct-current signal the amplitude of which is to be maintained substantially equal to the amplitude of the alternating-current signal at preselected instants of time corresponding substantially to the maximum positive and negative amplitudes of the cycle thereof, means for deriving a voltage corresponding to the difference between the positive and negative amplitudes of the alternating-current signal and the positive and negative amplitudes, respectively, of the push-pull signal, means for sampling the difference voltage at the said preselected instants, means for maintaining the sampled difference voltage derived at each preselected instant substantially constant until the occurrence of the next successive preselected instant, thereby to produce a substantially rectangular-wave signal, and means for applying the substantially rectangular-wave signal to the load.

9. An electric system having, in combination, means for producing an alternating-current signal for controlling a load, means for producing a fluctuating push-pull direct-current signal the amplitude of which is to be maintained substantially equal to the amplitude of the alternating-current signal at preselected instants of time corresponding substantially to the maximum positive and negative amplitudes of the cycle thereof, means for selecting predetermined frequency components of the fluctuating push-pull signal, means for deriving a voltage corresponding to the difference between the positive and negative amplitudes of the alternating-current signal and the positive and negative amplitudes, respectively, of the frequency-selected fluctuating push-pull signal, means for sampling the difference voltage at the said preselected instants, means for maintaining the sampled difference voltage derived at each preselected instant substantially constant until the occurrence of the next successive preselected instant, thereby to produce a substantially rectangular-wave signal, and means for applying the substantially rectangular-wave signal to the load.

10. An electric system having, in combination, means for producing an alternating-current signal for controlling a moving object, means for producing a further signal related to the velocity or acceleration of the moving object, means for deriving a voltage corresponding to the difference between the amplitude of the alternating-current signal and the amplitude of the further signal, means for sampling the signals at preselected instants of time only, means for maintaining the sampled signals derived at each preselected instant substantially constant until the occurrence of the next successive preselected instant, thereby to produce a substantially rectangular-wave signal, and means for connecting the difference-voltage-deriving means with the sampling and maintaining means to apply the difference voltage as a substantially rectangular-wave signal to modify the control of the moving object.

11. An electric system having, in combination, means for producing an alternating-current signal for controlling a moving object, means for producing a direct-current signal related to the velocity or acceleration of the moving object, means for deriving a voltage corresponding to the difference between the amplitude of the alternating-current signal and the amplitude of the direct-current signal, means for sampling the difference voltage at preselected instants of time, means for maintaining the sampled difference voltage derived at each preselected instant substantially constant until the occurrence of the next successive preselected instant, thereby to produce a substantially rectangular-wave signal, and means for applying the substantially rectangular-wave signal to modify the control of the moving object.

12. An electric system having, in combination, means for producing an alternating-current signal for controlling a moving object, means for producing a direct-current signal related to the velocity or acceleration of the moving object, means for deriving a voltage corresponding to the difference between the amplitude of the alternating-current signal and the amplitude of the direct-current signal, means for sampling the difference voltage at preselected instants of time corresponding substantially to the maximum amplitude of the cycle of the alternating-current signals, means for maintaining the sampled difference voltage derived at each preselected instant substantially constant until the occurrence of the next successive preselected instant, thereby to produce a substantially rectangular-wave signal, and means for applying the substantially rectangular-wave signal to modify the control of the moving object.

13. An electric system having, in combination, means for producing an alternating-current signal for controlling a moving object, means for producing a push-pull direct-current signal related to the velocity or acceleration of the moving object, means for deriving a voltage corresponding to the difference between the positive and negative amplitudes of the alternating-current signal and the positive and negative amplitudes, respectively, of the push-pull signal, means for sampling the difference voltage at preselected instants of time during the positive and negative half-cycles of the alternating-current signal, means for maintaining the sampled difference voltage derived at each preselected instant substantially constant until the occurrence of the next successive preselected instant, thereby to produce a substantially rectangular-wave signal, and means for applying the substantially rectangular-wave signal to modify the control of the moving object.

14. An electric system having, in combination, means for producing an alternating-current signal for controlling a moving object, means for producing a fluctuating push-pull direct-current signal related to a derivative of the positional movement of the moving object, means for selecting predetermined frequency components of the fluctuating push-pull signal, means for deriving a voltage corresponding to the difference between the positive and negative amplitudes of the alternating-current signal and the positive and negative amplitudes, respectively, of the frequency-selected fluctuating push-pull signal, means for sampling the difference voltage at preselected instants of time corresponding substantially to the maximum positive and negative amplitudes of the cycle of the alternating-current signal, means for maintaining the sampled difference voltage derived at each preselected instant substantially constant until the occurrence of the next successive preselected instant, thereby to produce a substantially rectangular-wave signal, and means for applying the substantially rectangular-wave signal to modify the control of the moving object.

15. An electric system having, in combination, means for producing an alternating-current signal to control a moving object, means responsive to the moving object for producing a fluctuating direct-current signal related to a derivative of the positional movement of the moving object, means for selecting the predetermined frequency components of the fluctuating signal, means comprising a summing network for deriving a voltage corresponding to the difference between the amplitude of the alternating-current signal and the amplitude of the direct-current signal, means comprising a magnetic circuit for sampling the difference voltage at preselected instants, and means connected with the magnetic circuit for maintaining the sampled difference voltage derived at each preselected instant substantially constant until the occurrence of the next successive preselected instant, thereby to produce a substantially rectangular-wave signal, and means for applying the substantially rectangular-wave signal to modify the control of the moving object.

16. An electric system having, in combination, means for producing an alternating-current signal for controlling a servo motor and the like; a first feed-back path responsive to the operation of the motor for controlling the producing means; a second feed-back path connected between the motor and amplifier means and comprising means responsive to the motion of the motor and the like for producing a fluctuating direct-current signal related to the velocity of the servo motor and the like and means for selecting the high-frequency components of the fluctuating signal; means connected in the second feed-back path for deriving a voltage corresponding to the difference between the amplitude of the alternating-current signal and the amplitude of the frequency-selected direct-current signal, means for sampling the difference voltage at preselected instants, means for maintaining the sampled difference voltage derived at each preselected instant substantially constant until the occurrence of the next successive preselected instant, thereby to produce a substantially rectangular-wave correction signal, and means for applying the correction signal to modify the control of the servo motor and the like.

17. An electric system having, an combination, means for producing an alternating-current signal for controlling a servo motor and the like; a first feed-back path responsive to the operation of the motor for controlling the producing means; a second feed-back path connected between the motor and amplifier means and comprising means responsive to the motion of the motor and the like for producing a fluctuating direct-current signal related to the acceleration of the servo motor and the like and means for selecting the low-frequency components of the fluctuating signal, means connected in the second feed-back path for deriving a voltage corresponding to the difference between the amplitude of the alternating-current signal and the amplitude of the frequency-selected direct-current signal, means for sampling the difference voltage at preselected instants, means for maintaining the sampled difference voltage derived at each preselected instant substantially constant until the occurrence of the next successive preselected instant, thereby to produce a substantially rectangular-wave correction signal, and means for applying the correction signal to modify the control of the servo motor and the like.

18. An electric system as claimed in claim 16 and in which the direct-current signal producing means comprises a tachometer circuit.

19. An electric system as claimed in claim 16 and in which the direct-current signal producing means comprises an alternating-current tachometer and a demodulator, and the frequency-selecting means comprises high-pass filter means.

20. Apparatus of the character described that comprises means for producing an alternating-current signal and a push-pull direct-current signal for amplitude comparison, means for subtracting the positive and negative signal amplitudes to obtain a difference signal, means for sampling the difference signal at successive preselected instants of time only, and means for maintaining the sampled difference signal obtained at each preselected instant substantially constant until the occurrence of the next successive preselected instant.

21. Apparatus of the character described that comprises means for producing an alternating-current servo signal for controlling a servo motor and the like, means for detecting the velocity or acceleration of the servo motor and the like and producing a direct-current signal corresponding thereto, means for subtracting the alternating and direct-current signals to produce a difference signal, means for sampling the difference signal at preselected instants of time, means for maintaining the sampled difference signal at each preselected instant substantially constant until the occurrence of the next successive preselected instant, and means for applying the sampled difference signal to the servo motor and the like.

22. Apparatus of the character described that comprises means for producing an alternating-current servo signal for controlling a servo motor and the like, means for detecting the velocity or acceleration of the servo motor and the like and producing a push-pull direct-current signal corresponding thereto, means for subtracting positive and negative voltage amplitudes of the signals, means for sampling the resulting difference signals at preselected instants of time only, means for maintaining the sampled difference signal at each preselected instant substantially constant until the occurrence of the next successive preselected instant, and means for applying the difference signal to the servo motor and the like.

23. Apparatus as claimed in claim 21 and in which means is provided for selecting the preselected instants at substantially the instants of maximum amplitude of the alternating-current signal.

References Cited in the file of this patent

UNITED STATES PATENTS

| 2,423,540 | Wills | July 8, 1947 |
| 2,424,146 | Caldwell et al. | July 15, 1947 |
| 2,657,348 | Jarvis | Oct. 27, 1953 |
| 2,881,375 | Kennedy | Apr. 7, 1959 |